United States Patent
Bisiaux et al.

(10) Patent No.: US 10,333,966 B2
(45) Date of Patent: Jun. 25, 2019

(54) QUARANTINING AN INTERNET PROTOCOL ADDRESS

(71) Applicant: EFFICIENT IP SAS, La Garenne Colombes (FR)

(72) Inventors: Jean-Yves Bisiaux, La Garenne Colombes (FR); Sylvain Galliano, La Garenne Colombes (FR)

(73) Assignee: EFFICIENT IP SAS, La Garenne Colombes (FR)

( * ) Notice: Subject to any disclaimer, the term of this patent is extended or adjusted under 35 U.S.C. 154(b) by 279 days.

(21) Appl. No.: 15/267,864

(22) Filed: Sep. 16, 2016

(65) Prior Publication Data
US 2017/0099316 A1    Apr. 6, 2017

(30) Foreign Application Priority Data
Oct. 2, 2015 (EP) .................................... 15306553

(51) Int. Cl.
*G06F 21/00* (2013.01)
*H04L 9/00* (2006.01)
(Continued)

(52) U.S. Cl.
CPC ........ *H04L 63/1441* (2013.01); *H04L 47/286* (2013.01); *H04L 61/1511* (2013.01);
(Continued)

(58) Field of Classification Search
None
See application file for complete search history.

(56) References Cited

U.S. PATENT DOCUMENTS

| 2008/0082658 A1* | 4/2008 | Hsu .................. H04L 51/12 709/224 |
| 2013/0198269 A1* | 8/2013 | Fleischman ............ H04L 61/20 709/203 |

(Continued)

OTHER PUBLICATIONS

ISC Support, "What is the difference between allow-query-cache and allow-recursion? : Internet Systems Consortium Knowledge Base", Oct. 24, 2011, pp. 1-2, XP055254850. Retrieved from the Internet on Jul. 26, 2016: URL https://kb.isc.org/article/AA-00503/0/Whats-the-difference-between-allow-query-cache-and-allow-recursion.html.

(Continued)

*Primary Examiner* — Alexander Lagor
(74) *Attorney, Agent, or Firm* — BCF LLP

(57) ABSTRACT

Method(s) and a Domain Name Server (DNS) for quarantining an IP address of a computing device are described. The DNS may implement method(s) that include receiving a request at the DNS and analyzing the request based on a pre-defined set of rules. The IP address of the computing device may be quarantined by the DNS and a quarantine mode may be triggered. In the quarantine mode, restricted services may be provided by the DNS. Further the method includes providing a response corresponding to the request to the computing device. The response available in the cache can either be an expired response or an unexpired response based on a Time to Live of the response. If the response is not available, then the method includes abstaining from providing the response corresponding to the request. The abstaining may include not performing a recursive search for accessing the response corresponding to the request.

15 Claims, 4 Drawing Sheets

(51) Int. Cl.
*H04L 29/06* (2006.01)
*H04L 29/12* (2006.01)
*H04L 12/841* (2013.01)

(52) U.S. Cl.
CPC ...... *H04L 61/6009* (2013.01); *H04L 63/1425* (2013.01); *H04L 63/1458* (2013.01); *H04L 63/1491* (2013.01)

(56) References Cited

U.S. PATENT DOCUMENTS

| | | | | |
|---|---|---|---|---|
| 2015/0180892 A1* | 6/2015 | Balderas | ............ | H04L 63/1416 726/11 |
| 2016/0080413 A1* | 3/2016 | Smith | ................ | H04L 63/1458 726/23 |

OTHER PUBLICATIONS

Damas ISC F Neves Registro Br J, "Preventing Use of Recursive Nameservers in Reflector Attacks, RFC5358.TXT", Preventing Use of Recursive Nameservers in Reflector Attacks; RFC5358.TXT. Internet Engineering Task Force. IETF; Standard. Internet Society (ISOC) 4, Rue Des Falaises Ch-1205 Geneva, Switzerland, Oct. 1, 2008, XP015060333; Retrieved from the Internet on Jul. 26, 2016: https://www.ietf.org/rfc/rfc5358.txt.
European Search Report with regard to EP 15 30 6553 dated Mar. 4, 2016.

* cited by examiner

QUARANTINING AN INTERNET PROTOCOL ADDRESS

CROSS-REFERENCE

This United States Non-Provisional patent application claims priority from European Patent Application Serial No. 15306553.7, filed on Oct. 2, 2015, the entire content of which is incorporated herein by reference.

TECHNICAL FIELD

The present subject matter relates, in general, to quarantining an IP address of a computing device and, in particular, to quarantining IP address on a Domain Name Server (DNS).

BACKGROUND

Domain Name Server (DNS), in general, refers to a service or a server that translates a domain name, such as, a website name or a Uniform Resource Locator (URL) into an Internet Protocol (IP) address. The IP address may be an identifier of a node (computing device), in particular, a host, within a network of nodes and may be utilized for communication between the host and other nodes within the network. The host, as identified by the IP address, may store content associated with the website name or the URL and may provide the content to the DNS and/or a client device of a user that requested the domain name. For translating the domain name into the IP address, the DNS may utilize mapping information that generally includes records of most frequently requested domain names with their respective IP addresses.

On some instances, the DNS may not be able to translate the domain name to the corresponding IP address, due to reasons, such as unavailability of the mapping information for the domain name. The DNS, on such occasions, may request another DNS, often referred to as a backend server or an authoritative server, to provide the corresponding IP address. The backend server, upon receiving the request, may search for the corresponding IP address within mapping information stored in the cache (or database) of the backend server and provide the corresponding IP address to the DNS. A host may then be identified based on the IP address for retrieving content associated with the domain name and providing the content to the client device.

SUMMARY

This summary is provided to introduce concepts related to quarantining an IP address of a computing device. This summary is not intended to identify essential features of the claimed subject matter nor is it intended for use in determining or limiting the scope of the claimed subject matter.

In an example implementation of the present subject matter, a method for quarantining an Internet Protocol (IP) address corresponding to a computing device is described. In an example, the method comprises receiving a request from the computing device at a Domain Name Server (DNS) and quarantining the IP address corresponding to the computing device, by the DNS, by analyzing the request based on a pre-defined set of rules, to trigger a quarantine mode, where restricted services are provided to the computing device in the quarantine mode. The method further includes providing, by the DNS in the quarantine mode, a response corresponding to the request, if the response is available in a cache, where the response is one of an expired response and an unexpired response based on a Time to Live (TTL) of the response. The method also includes abstaining, by the DNS in the quarantine mode, from providing the response corresponding to the request, if the response is not available in the cache, where the abstaining comprises not performing a recursive search for accessing the response corresponding to the request.

In another example implementation of the present subject matter, the DNS for quarantining an IP address corresponding to a computing device is described. In the example, the DNS includes a processor and a quarantine engine coupled to the processor. The quarantine engine is to receive a request from the computing device, and quarantine the IP address of the computing device by analyzing the request based on a pre-defined set of rules to trigger a quarantine mode, where restricted services are provided to the computing device in the quarantine mode. The DNS further includes a communication module coupled to the processor, where the communication module is to provide, in the quarantine mode, a response corresponding to the request, to the computing device, if the response is available in a cache, where the response is one of an expired response and an unexpired response based on a Time to Live (TTL) of the response. The communication module is to further abstain, in the quarantine mode, to provide the response corresponding to the request, if the response is not available in the cache, wherein the communication module is also to further abstain from performing a recursive search for accessing the response corresponding to the request.

The present subject matter also describes a non-transitory computer readable medium, according to an example implementation of the present subject matter. The non-transitory computer readable medium may include a set of computer readable instructions that, which when executed, cause a computing system to receive a domain name request from the computing device, and quarantine the IP address of the computing device by analyzing the domain name request based on a pre-defined set of rules to trigger a quarantine mode, wherein restricted services are provided to the computing device in the quarantine mode. The computer readable instructions, when executed may further cause the computing system to provide, in the quarantine mode, a response corresponding to the domain name request, to the computing device, if the response is available in a cache, where the response is one of an expired response and an unexpired response based on a Time to Live (TTL) of the response, and abstain, in the quarantine mode, from providing the response corresponding to the request, if the response is not available in the cache, wherein the computer readable medium is to further abstain from performing a recursive search for accessing the response corresponding to the domain name request.

BRIEF DESCRIPTION OF THE DRAWINGS

The detailed description is described with reference to the accompanying figure(s). In the figure(s), the left-most digit(s) of a reference number identifies the figure in which the reference number first appears. The same numbers are used throughout the figure(s) to reference like features and components. Some implementations of systems and/or methods in accordance with implementations of the present subject matter are now described, by way of example only, and with reference to the accompanying figure(s), in which.

DETAILED DESCRIPTION

Figure 1:
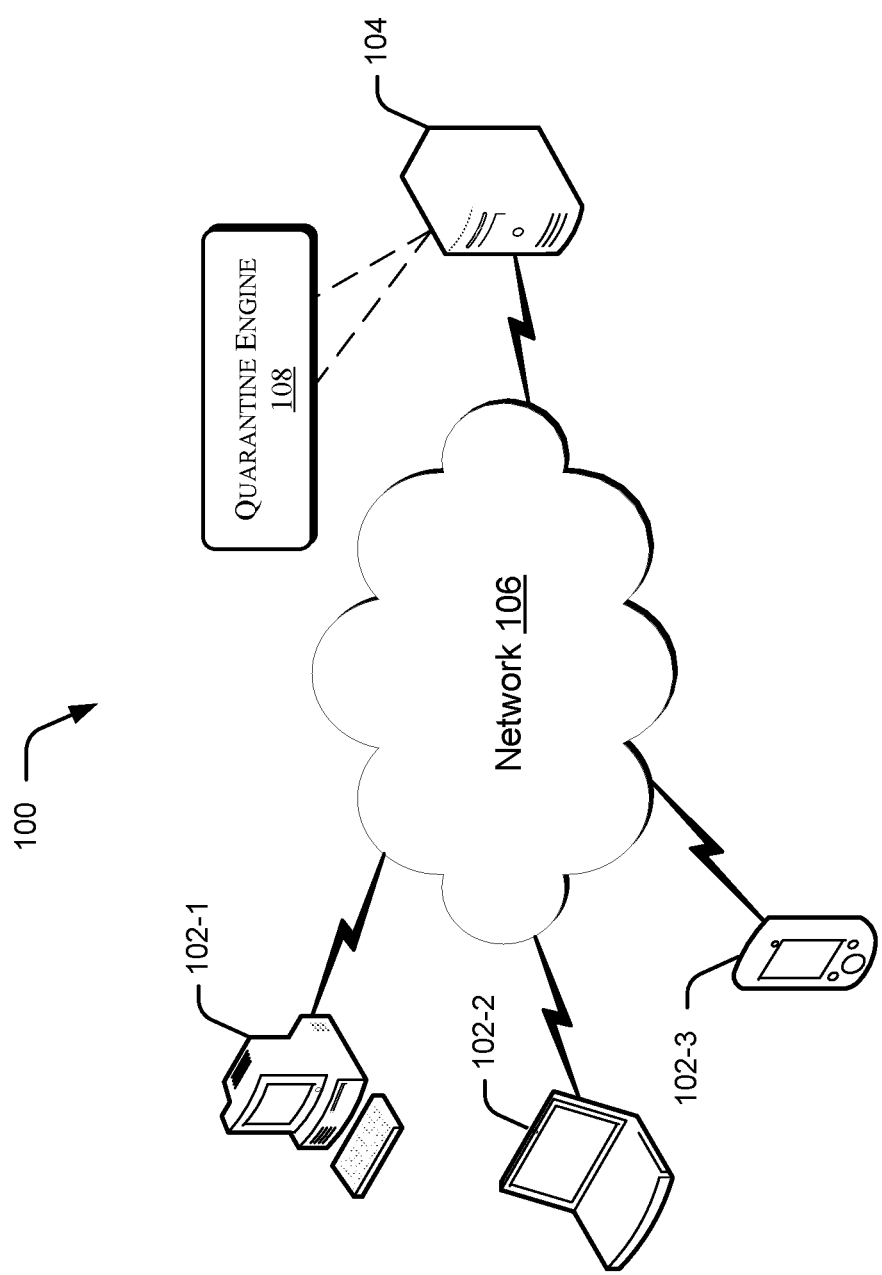
FIG. 1 illustrates a network environment, implementing a DNS, according to an implementation of the present subject matter.

Conventionally, various techniques for quarantining Internet Protocol (IP) address of a computing device connected to a network have been developed. The known techniques include methods of analyzing traffic generated from various computing devices, determining if the amount of traffic exceeds a predefined threshold, and initiating a suitable action against computing devices that generate such traffic. Such computing devices may be compromised by a malicious user and therefore may generate excess traffic. The excess traffic may correspond to excess requests generated from such computing devices that are transmitted to a Domain Name Server (DNS). Further, the excess traffic may also be experienced by the DNS when the DNS is to send excess responses to computing devices in response to the requests.

The known techniques compare the amount of requests or the amount of response with the predefined threshold to determine a condition of traffic overload. The computing devices are then quarantined if the amount of request exceeds the predefined threshold in order to prevent an impact of the traffic overload on the network and network elements.

After quarantining such computing devices, services provided to the computing devices from various network elements, such as the DNS, in form of responses or information corresponding to web servers that host online content may be completely discontinued. Further, network communication such as requests generated from the computing devices is usually blocked. For instance, if a computing device is quarantined, then a request from the computing device related to IP resolution of a searching website is prevented from reaching the DNS. Therefore, the request is not processed and an error message is sent to the computing device after a long wait time. Also, the computing devices are retained as quarantined for a prolonged time period until an acceptable amount of traffic in form of requests or responses is generated from such computing devices. The known techniques may also maintain a list of such computing devices that are quarantined and may block requests from computing devices belonging to the list.

Therefore, the computing devices experience loss of data during transmission of request as the request is blocked and remains unprocessed by the DNS. Further, identification of requests from quarantined computing devices and blocking such requests on a regular basis may cause additional tasks to be performed by the network elements, thereby making the overall process complex, and time and resource consuming. Also, the error messages and long wait times at the computing devices for the prolonged time period may impact service continuity to the computing devices.

In accordance with an example implementation of the present subject matter, system(s) and method(s) for quarantining an Internet Protocol (IP) address of a computing device are described. The described technique of quarantining the IP address are time and resource efficient and minimizes data loss related to requests transmitted from a quarantined computing device. Further, the described technique provides restricted services to the quarantined computing device to ensure service continuity to the quarantined computer device.

In an implementation of the present subject matter, a method for quarantining an Internet Protocol (IP) address of a computing device is described. The method includes receiving a request at the DNS from the computing device. The request may be related to an IP address of a server that hosts a specific website that a user of the computing device intends to access. Thereafter, the request is analysed based on a pre-defined set of rules to determine conformance of the request with various quarantine parameters defined in the pre-defined set of rules. If the request violates one or more quarantine parameters as defined in the pre-defined set of rules, then the IP address may be quarantined by the DNS and a quarantine mode may be triggered.

For example, the pre-defined set of rules defines a threshold value of number of requests received from a computing device within a specified time. If the computing device sends number of requests that exceed the threshold value of number of requests as defined in the pre-defined set of rules, then the IP address of the computing device is quarantined by the DNS and a quarantine mode is triggered for the IP address.

In the quarantine mode, restricted services are provided to the computing device by the DNS whereby the services provided to the computing device are not completely discontinued. In particular, a DNS, after receiving the request, searches for a response in a cache of the DNS. If the response is available in the cache, then the DNS provides the response to the computing device. In a scenario, the response available in the cache may be one of an expired response and an unexpired response based on a Time to Live (TTL) value of the response. If the response is not available in the cache, then the DNS abstains from providing the response to the computing device to prevent a recursive search for obtaining the response from an authoritative server.

Techniques of the present subject matter provide enhanced management of quarantined IP addresses by providing services to the computing devices during quarantine mode. Also, providing a response that is available in the cache to the computing device may allow the DNS to respond in a time bound manner thereby reducing processing time of the request and wait time for a user of the computing device thereby ensuring service continuity to the computing devices.

It should be noted that the description merely illustrates the principles of the present subject matter. It will thus be appreciated that those skilled in the art will be able to devise various arrangements that, although not explicitly described herein, embody the principles of the present subject matter and are included within its spirit and scope. Furthermore, all examples recited herein are principally intended expressly to be only for explanatory purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and implementations of the invention, as well as specific examples thereof, are intended to encompass equivalents thereof.

It will also be appreciated by those skilled in the art that the words during, while, and when as used herein are not exact terms that mean an action takes place instantly upon an initiating action but that there may be some small but reasonable delay, such as a propagation delay, between the initial action and the reaction that is initiated by the initial action. Additionally, the words "connected" and "coupled" are used throughout for clarity of the description and can include either a direct connection or an indirect connection. Thus, if a first device couples to a second device, that connection may be through a direct electrical or mechanical connection, through an indirect electrical or mechanical connection via other devices and connections, through an optical electrical connection, or through a wireless electrical connection. Various implementations of the present subject matter have been described below by referring to several examples.

The above mentioned methods and systems are further described with reference to FIG. 1 to FIG. 4. It should be noted that the description and figures merely illustrate the principles of the present subject matter along with examples described herein and, should not be construed as a limitation to the present subject matter. It is thus understood that various arrangements may be devised that, although not explicitly described or shown herein, embody the principles of the present subject matter. Moreover, all statements herein reciting principles, aspects, and specific examples thereof, are intended to encompass equivalents thereof.

FIG. 1 illustrates a network environment 100 according to an implementation of the present subject matter. The network environment 100 may either be a public distributed environment or may be a private closed network environment. The network environment 100 may include different computing devices 102-1, 102-2, ..., 102-N, communicatively coupled to a Domain Name Server (DNS) 104 through a network 106. For the sake of explanation, the computing devices 102-1, 102-2, ..., 102-N, have been commonly referred to as computing devices 102, and have been individually referred to as computing device 102, hereinafter. The DNS 104 may include a quarantine engine 108 for quarantining IP addresses of the computing devices 102.

In an implementation of the present subject matter, the computing device 102 may be one of a desktop, a mobile device and a laptop through which a user may request a website using a Uniform Resource Locator (URL). In an implementation, the DNS 104 may be a name server for parsing domain name requests and identifying a Top Level Domain (TLD) and Second Level Domain (SLD) from the domain name request and translating the domain name request into a corresponding Internet Protocol (IP) address. The DNS 104 may also be one of a web server that provides access to the digital content to the computing devices 102, recursive DNS, forwarding DNS and a caching DNS.

The network 106 may be a wireless or a wired network, or a combination thereof. The network 106 can be a collection of individual networks, interconnected with each other and functioning as a single large network (e.g., the internet or an intranet). Examples of such individual networks include, but are not limited to, Global System for Mobile Communication (GSM) network, Universal Mobile Telecommunications System (UMTS) network, Personal Communications Service (PCS) network, Time Division Multiple Access (TDMA) network, Code Division Multiple Access (CDMA) network, Next Generation Network (NGN), Public Switched Telephone Network (PSTN), and Integrated Services Digital Network (ISDN). Depending on the technology, the network 106 includes various network entities, such as transceivers, gateways, and routers; however, such details have been omitted for ease of understanding.

The network environment 100 is associated with a DNS 104 that may receive requests related to web content from the computing devices 102 and may provide response in form of address of web servers that host the web content. The requests may be generated when a user may intend to access a website through the computing device 102 and enter a website name or a Uniform Resource Locator (URL) in address bar of a web explorer. The DNS 104 may fetch the IP address of the computing device 102 from the received request and then utilize the IP address for transmitting the response to the computing device 102. The DNS 104 may also store the IP address of the computing device 102 for responding to subsequent requests from the computing device 102 with reduced roundtrip time.

In an implementation of the present subject matter, the quarantine engine 108 of the DNS 104 may receive the requests from the computing device 102. The quarantine engine 108 may then analyse the requests based on a pre-defined set of rules that are stored within the DNS 104. Thereafter, the quarantine engine 108 may determine if the IP address of the computing device 102 may have to be quarantined based on conformance of the request with the pre-defined set of rules. For example, if the pre-defined set of rules define the maximum number of requests from a computing device 102 received within 10 seconds as 25, and the number of requests received from the computing device 102 exceeds the maximum number of requests within 10 seconds then the IP address of the computing device 102 is quarantined.

In a scenario, if the request conforms with the predefined set of rules, then one or more domain names in the request that are associated with one or more websites may be identified. Thereafter, the DNS 104 may check whether corresponding IP addresses of the one or more domain names are available within the cache of the DNS 104. In the said scenario, each IP address available within the cache may be associated with a host that stores content related to the one or more websites. If the corresponding IP address is available, then the DNS 104 may generate a corresponding response for the request and transmit the response to the computing device 102. The computing device 102 may then communicate with respective hosts based on the IP addresses received from the DNS 104.

However, if the request does not conform with the pre-defined set of rules, then the quarantine engine 108 may quarantine the IP address of the computing device 102 and trigger a quarantine mode for the IP address. In the quarantine mode, the DNS 104 may not completely discontinue the services provided to the computing device 102 but instead provide restricted services. Therefore, the present subject matter ensures service continuity to the computing device 102 when the computing device 102 is in the quarantine mode. The explanation regarding functioning of the DNS 104 and quarantining the IP address of the computing device 102 have been further explained in detail with respect to the description of forthcoming figures.

Figure 2:
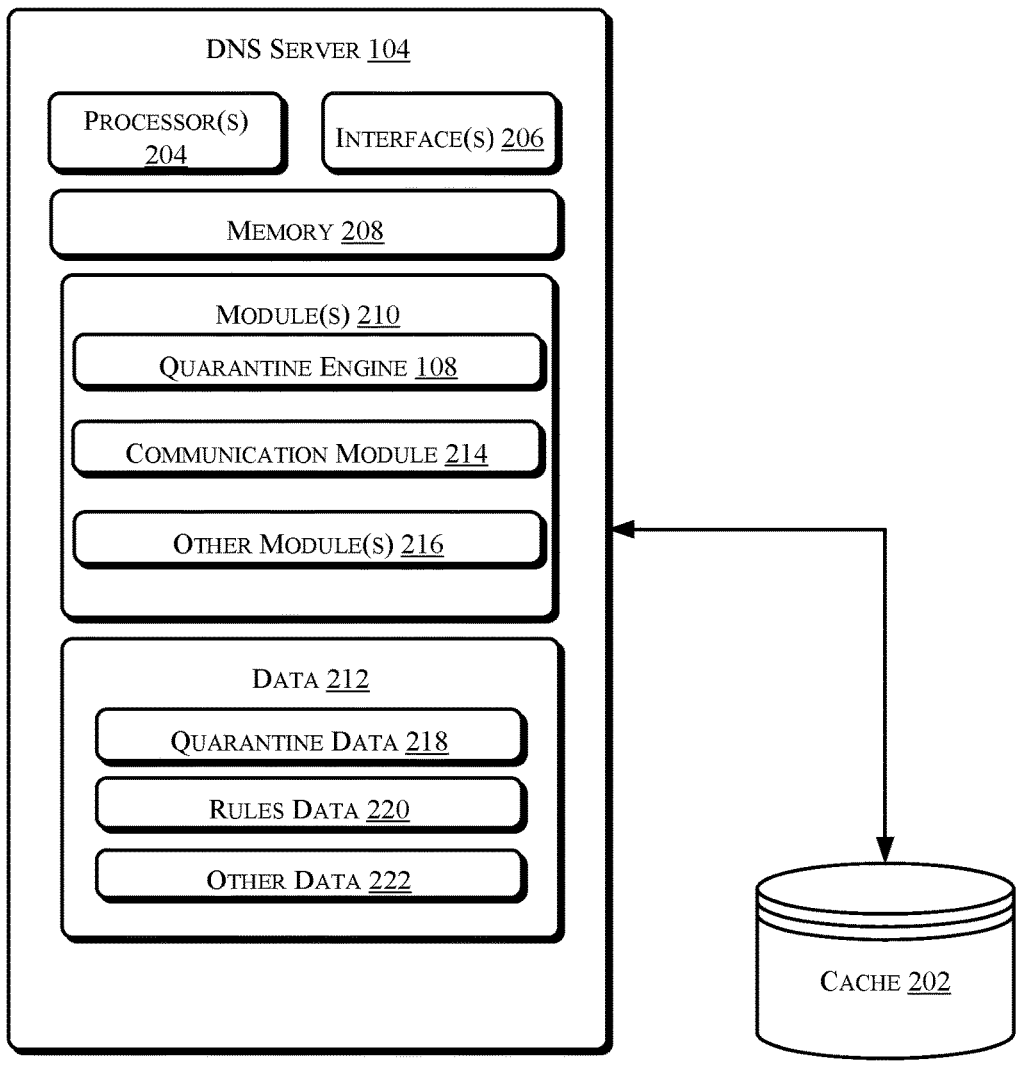
FIG. 2 illustrates schematic representation of components of the DNS, in accordance with an implementation of the present subject matter.

FIG. 2 illustrates components of the DNS 104, in accordance with an implementation of the present subject matter. The DNS 104 may be associated with a cache 202. The DNS 104 may include a processor(s) 204, an interface(s) 206, and a memory 208. Further, the DNS 104 may include module(s) 210 and data 212.

Among other capabilities, the cache 202 may serve as an external repository for storing information about frequently requested domain names and host IP addresses. In an implementation of the present subject matter, the cache 202 may store mapping information for domain names and their respective IP addresses. In an example implementation, the cache 202 may be an internal repository within the DNS 104 for storing the information about frequently requested domain names. Although the cache 202 has been depicted to be outside the DNS 104, the cache 202 may be also be implemented within the DNS 104, such as within the memory 208, according to an implementation of the present subject matter.

The processor 204, amongst other capabilities, may be configured to fetch and execute computer-readable instructions stored in the memory 208. The processor 204 may be implemented as one or more microprocessors, microcomputers, microcontrollers, digital signal processors, central processing units, state machines, logic circuitries, and/or any devices that manipulate signals based on operational instructions. The functions of the various elements shown in the figure, including any functional blocks labelled as "processor(s)", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), non-volatile storage. Other hardware, conventional and/or custom, may also be included.

The interface(s) 206 may include a variety of machine readable instructions-based interfaces and hardware interfaces that allow the DNS 104 to interact with different entities, such as the processor 204, the module 210, and the data 212. Further, the interface(s) 206 may enable the components of the DNS 104 to communicate with other DNS, and external repositories. The interfaces 206 may facilitate multiple communications within a wide variety of networks and protocol types, including wireless networks, wireless Local Area Network (WLAN), RAN, satellite-based network, etc.

The memory 208 may be coupled to the processor 204 and may, among other capabilities, provide data and instructions for generating different requests. The memory 208 can include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes.

The module(s) 210 may include routines, programs, objects, components, data structures, and the like, which perform particular tasks or implement particular abstract data types. The module(s) 210 may further include modules that supplement applications on the DNS 104, for example, modules of an operating system. Further, the module 210 can be implemented in hardware, instructions executed by a processing unit, or by a combination thereof.

In another aspect of the present subject matter, the module(s) 210 may be machine-readable instructions (software) which, when executed by a processor/processing unit, perform any of the described functionalities. The machine-readable instructions may be stored on an electronic memory device, hard disk, optical disk or other machine-readable storage medium or non-transitory medium. In one implementation, the machine-readable instructions can be also be downloaded to the storage medium via a network connection.

The data 212 serves, amongst other things, as a repository for storing data that may be fetched, processed, received, or generated by one or more of the module(s) 210.

The module(s) 210 may perform different functionalities which may include, but may not be limited to, quarantining the IP address of the computing device 102, providing a response corresponding to a request in the quarantine mode, and abstaining in providing the response to the computing devices 102 and communicating with back end servers. Accordingly, the module(s) 210 may include a quarantine engine 108, and a communication module 214. Further, the module(s) 210 may include other module(s) 216 for some additional operations, such as, but may not be limited to, selection of parameters of the pre-defined set of rules and determining one or more rules to be implemented during quarantine mode. The data 212 may include quarantine data 218, rule data 220 and other data 222.

In operation, the quarantine engine 108 may receive multiple requests from the computing device 102 within a specified time period. The quarantine engine 108 may analyse the multiple requests based on the pre-defined set of rules. In an example, the quarantine engine 108 may be capable of analysing a maximum number of requests from a computing device, depending upon the analysing capacity of the quarantine engine 108. The pre-defined set of rules may include multiple quarantine parameters that may be compared with the multiple requests to determine whether the multiple requests conform with the quarantine parameters.

In a scenario, the quarantine parameters may be related to one of number of requests received from the IP address of the computing device during a time period, number of requests for which a corresponding response is not available in the cache received from the IP address of the computing device during the time period, and cumulative time for finding a response by recursive search for the IP address of the computing device during the time period. Further, the quarantine parameters may be related to number of different requests received from the IP address of the computing device during the time period, and number of requests for which a corresponding response includes either 'NX domain' attribute or a 'ServerFail' during the time period.

In an implementation, the quarantine engine 108 may compare the quarantine parameters with a threshold value from a list of threshold values to determine if the quarantine parameters exceed the threshold value. In an implementation of the present subject matter, if the multiple requests fail to conform with the quarantine parameters of the pre-defined set of rules, then the quarantine engine 108 may quarantine the IP address of the computing device 102 and trigger a quarantine mode for the computing device 102. For instance, if the response corresponding to the requests include either 'NX domain' attribute or a 'ServerFail' attribute, then the IP address of the computing device 102 is quarantined.

In an example, the quarantine parameters may be related to a threshold value of maximum number of requests received by the quarantine engine 108, such that number of requests exceeding the threshold value may trigger the quarantine mode. In the said example, the threshold value for analysing number of requests may be set to 50,000 requests for a computing device 102. If the number of requests from the computing device 102 exceeds the threshold of 50,000 within a time duration, then a quarantine mode may be triggered. Similarly, if the threshold value is set to 70,000, then the quarantine engine 108 may trigger the quarantine mode when the number of requests exceed the threshold value of 70,000.

In another scenario, the quarantine engine 108 may maintain a list of quarantined IP addresses that includes the IP addresses that are quarantined by the quarantine engine 108. In the said scenario, the quarantine engine 108 may add the IP address of the computing device 102 to the list of quarantined IP addresses. The quarantine engine 108 may then share the information regarding the quarantined IP address of the computing device 102 with the communication module 214.

In an implementation, the communication module 214 may receive the information related to the communication module 214 from the quarantine engine 108. After receiving the information, the communication module 214 may provide restricted services to the computing device 102. In a scenario, for providing the restricted services, the communication module 214 may check if responses corresponding to the multiple requests are available in the cache 202. In a scenario, the responses may be one of expired responses and unexpired responses based on Time to Live (TTL) values of the responses. In an implementation, the TTL values of the responses in the quarantine mode may be longer than the TTL values of the responses in a non-quarantine mode to have the responses available in the cache 202 for a longer time. For instance, if the TTL of a response is 12 hrs in the cache during the non-quarantine mode, then the TTL of the same response may be updated to 15 hrs during the quarantine mode such that the response is available for longer time in the cache 202 thereby enhancing service provided to the computing device 102 during the quarantine mode.

In another scenario, the availability of the responses may also depend on a TTL value of the cache 202 that is related to a time period for which the cache 202 is available to provide the responses. In the present subject matter, availability of the cache 202 may not depend on the TTL value during the quarantine mode and therefore the cache is available during the quarantine mode. If the responses are available in the cache 202, then the communication module 214 may send the responses to the computing device 102.

If the responses are not available in the cache 202, then the communication module 214 may not perform a recursive search to communicate with an authoritative server to obtain the responses and then provide the responses to the computing device 102. Therefore, the communication module 214 may abstain, in the quarantine mode, from providing the responses corresponding to the requests to the computing device 102 if the responses are not available in the cache 202.

As the IP address of the computing device 102 is added to the list of quarantined IP addresses, the quarantine engine 108, for subsequent requests from the same IP address, may determine if the IP address is already present in the list. If the IP address is present in the list, then the DNS 104 may continue to provide restricted service to the computing device 102 as described earlier. In an implementation of the present subject matter, the quarantine engine 108 may continue to analyse requests from the computing device 102 that is in the quarantine mode, to determine if requests from the computing device 102 conform with the pre-defined set of rules. If the requests conform with the pre-defined set of rules, then the IP address of the computing device 102 may be automatically de-quarantined. In a scenario, the quarantine engine 108 may de-quarantine the IP address after expiry of a predetermined time period. The predetermined time period may be computed based on either an average time for which IP addresses are quarantined and then de-quarantined, or duration of past quarantine modes of specific computing devices 102. In another scenario, a user may analyse the requests from the computing device 102 in the quarantine mode to determine conformance of the requests with the pre-defined set of rules. If the user determines that the requests conform with the pre-defined set of rules, then the user may de-quarantine the IP address of the computing device 102.

Figure 3:
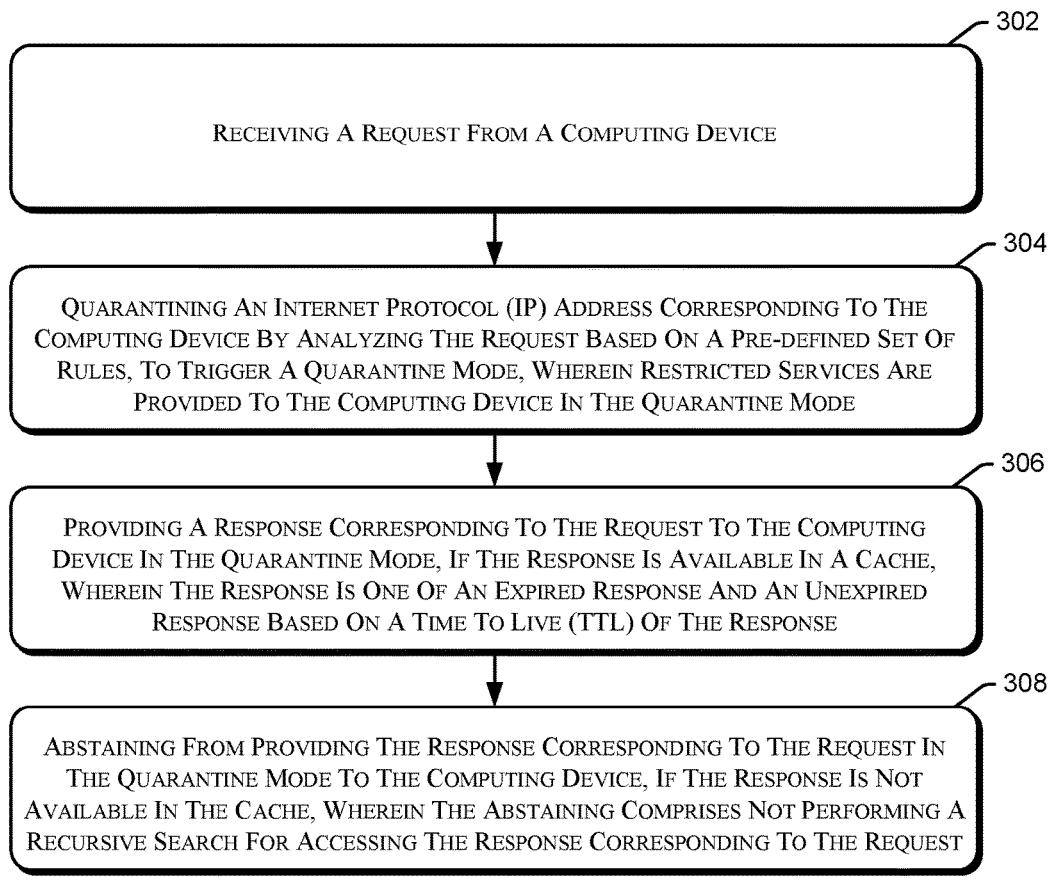
FIG. 3 illustrates a method for quarantining an IP address of a computing device, according to an implementation of the present subject matter.
Figure 4:
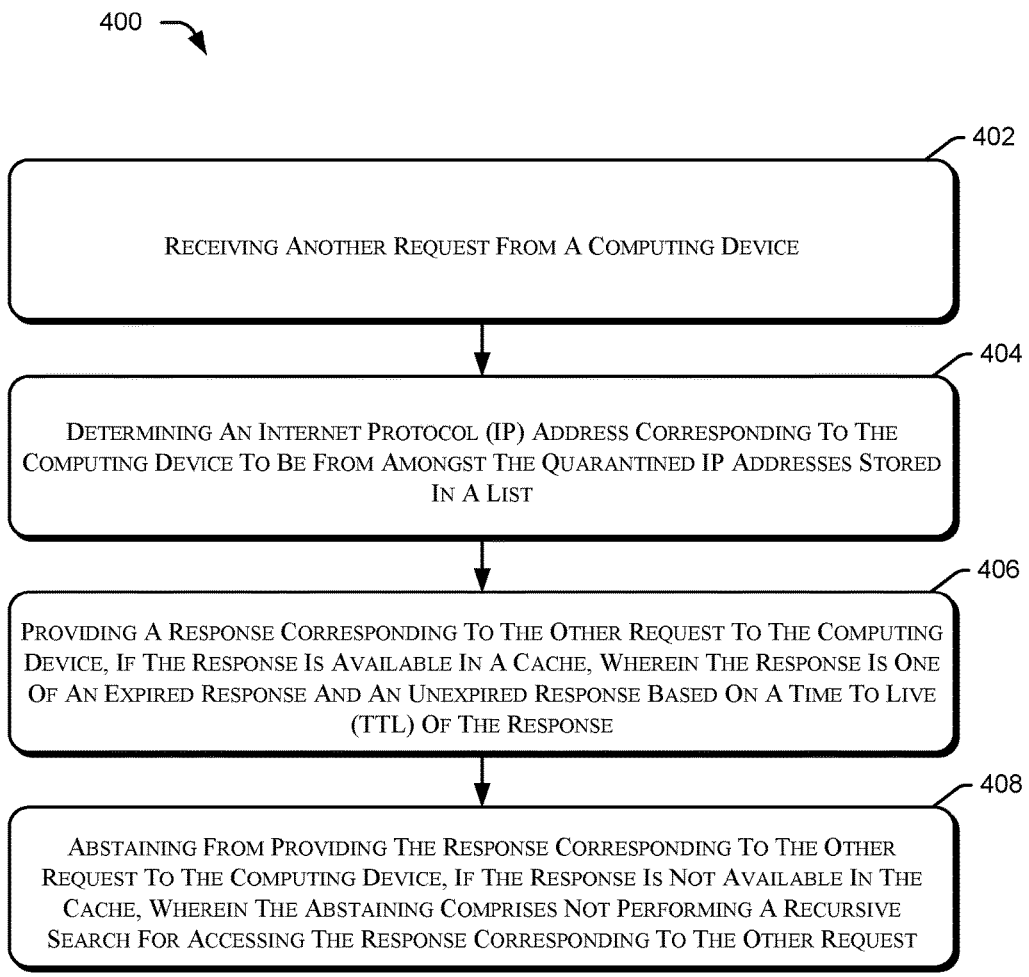
FIG. 4 illustrates a method for handling requests from a quarantined IP address, according to an implementation of the present subject matter; and It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

FIG. 3, and FIG. 4 illustrate methods 300, and 400 respectively. The order in which the methods 300 and 400 are described is not intended to be construed as a limitation, and any number of the described method blocks may be combined in any order to implement the methods 300 and 400, or alternative methods. Furthermore, the methods 300 and 400 may be implemented by processor(s) or computing system(s) through any suitable hardware, non-transitory machine readable instructions, or combination thereof.

It may be understood that steps of the methods 300, and 400 may be performed by programmed computing systems. The steps of the methods 300, and 400 may be executed based on instructions stored in a non-transitory computer readable medium, as will be readily understood. The non-transitory computer readable medium may include, for example, digital memories, magnetic storage media, such as one or more magnetic disks and magnetic tapes, hard drives, or optically readable digital data storage media. In an implementation of the present subject matter, the methods 300 and 400 may be executed by the DNS 104, as described earlier.

FIG. 3 illustrates the method 300 for quarantining an IP address of a computing device, according to an implementation of the present subject matter.

At block 302, a request may be received from a computing device 102. The request may be related to a web content that a user of the computer device 102 intends to access. In an implementation, the request may be received by the quarantine engine 108 at the DNS 104. Thereafter, at block 304, an IP address corresponding to the computing device 102 may be quarantined by analyzing the request based on a pre-defined set of rules to trigger a quarantine mode. In the quarantine mode, restricted services are provided to the computing device 102. In an implementation, the quarantine engine 108 of the DNS 104 may analyze the request based on the pre-defined set of rules and trigger the quarantine mode to provide the restricted services to the computing device 102.

At block 306, a response corresponding to the request is provided to the computing device 102 in the quarantine mode, if the response is available in a cache. In a scenario, the DNS 104 may provide the response and the response may be one of an expired response and an unexpired response based on a Time to Live (TTL) value of the response. In an implementation, the communication module 214 may check the response in the cache 202 and provide the response to the computing device 102 if the response is available in the cache 202. At block 308, the response may be abstained from providing to the computing device 102 in the quarantine mode, if the response is not available in the cache. The abstaining may comprise not performing a recursive search for accessing the response corresponding to the request. In an implementation, the communication module 214 of the DNS 104 may abstain from providing the response to the computing device 102 in the quarantine mode.

FIG. 4 illustrates the method 400 for handling requests from a quarantined IP address, according to an implementation of the present subject matter.

At block 402, another request from the computing device may be received. The request may be received by the quarantine engine 108. Thereafter, at block 404, the IP address corresponding to the computing device 102 is determined to be present in a list of quarantined IP addresses. In an implementation, the quarantine engine 108 may determine if the IP address of the computing device is present in the list of quarantined IP addresses. If the IP address of the computing device is present in the list, then a response corresponding to the request may be provided to the computing device 102 at block 406. In an implementation, the communication module 214 may provide the response to the computing device 102 if the response is available in the cache. The response provided to the computing device 102 may be one of an expired response and an unexpired response based on a Time to Live (TTL) value of the response.

At block 408, the response may be abstained from providing to the computing device 102, if the response is not available in the cache. The abstaining may comprise not performing a recursive search for accessing the response corresponding to the other request. In an implementation, the communication module 214 may abstain from providing the response to the computing device 102 if the response is not available in the cache 202.

Therefore, the described techniques are time and resource efficient that ensure service continuity to the computing devices during the quarantine mode and enhance management of quarantined IP addresses.

Although implementations of present subject matter have been described in language specific to structural features and/or methods, it is to be understood that the present subject matter is not necessarily limited to the specific features or methods described. Rather, the specific features and methods are disclosed and explained in the context of a few example implementations for DNS.

We claim:

1. A method for quarantining an Internet Protocol (IP) address corresponding to a computing device, the method comprising:
   receiving, at a Domain Name Server (DNS), a request from the computing device;
   quarantining, by the DNS, the IP address corresponding to the computing device by analyzing the request based on a pre-defined set of rules, to trigger a quarantine mode, wherein restricted services are provided to the computing device in the quarantine mode;
   providing, by the DNS, in the quarantine mode, a response corresponding to the request, if the response is available in a cache, wherein the response is one of an expired response and an unexpired response based on a Time to Live (TTL) of the response; and
   abstaining, by the DNS, in the quarantine mode, from providing the response corresponding to the request, if the response is not available in the cache, wherein the abstaining comprises not performing a recursive search for accessing the response corresponding to the request.

2. The method as claimed in claim 1, wherein the pre-defined set of rules include quarantine parameters wherein the quarantine parameters comprise at least one parameter from the following list of parameters: number of requests for which a corresponding response is not available in the cache received from the IP address of the computing device during a time period, cumulative time for finding a response by recursive search for the IP address of the computing device during the time period, number of one of different requests and same requests received from the IP address of the computing device during the time period, and number of requests for which a corresponding response includes at least one of a 'NXDOMAIN' attribute, a 'ServerFail' attribute and a standard attribute received from the IP address of the computing device during the time period.

3. The method as claimed in claim 2, wherein quarantining the IP address corresponding to the computing device comprises comparing at least one of the quarantine parameters with a threshold value from amongst a list of plurality of threshold values.

4. The method as claimed in claim 1 further comprising de-quarantining the IP address after expiry of a predetermined time period.

5. The method as claimed in claim 1, wherein quarantining the IP address of the computing device comprises storing the quarantined IP address in a list.

6. The method as claimed in claim 5 further comprising:
   receiving another request from the computing device;
   determining the IP address corresponding to the computing device to be from amongst the quarantined IP addresses stored in a list;
   providing, upon determining, a response corresponding to the another request, if the response is available in a cache, wherein the response is one of an expired response and an unexpired response based on a Time to Live (TTL) of the response; and
   abstaining from providing the response corresponding to the another request, if the response is not available in the cache, wherein the abstaining comprises not performing a recursive search for accessing the response corresponding to the request.

7. The method as claimed in claim 1, wherein the recursive search comprises communicating with an authoritative server for accessing the response corresponding to the request for which the response is not available in the cache.

8. The method as claimed in claim 1, wherein the IP address corresponding to the computing device is de-quarantined by a user.

9. A Domain Name Server (DNS) for quarantining an IP address corresponding to a computing device, the DNS comprising:
   a processor,
   a quarantine engine coupled to the processor, wherein the quarantine engine is configured to:
   receive a request from the computing device; and
   quarantine the IP address of the computing device by analyzing the request based on a pre-defined set of rules to trigger a quarantine mode, wherein restricted services are provided to the computing device in the quarantine mode, and
   a communication module coupled to the processor, wherein the communication module is configured to:
   provide, in the quarantine mode, a response corresponding to the request, to the computing device, if the response is available in a cache, wherein the response is one of an expired response and an unexpired response based on a Time to Live (TTL) of the response; and abstain, in the quarantine mode, to provide the response corresponding to the request, if the response is not available in the cache, wherein the communication module is also to further abstain from performing a recursive search for accessing the response corresponding to the request.

10. The DNS as claimed in claim 9, wherein the predefined set of rules includes quarantine parameters comprising at least one parameter from the following list of parameters: number of requests for which a corresponding response is not available in the cache received from the IP address of the computing device during a time period, cumulative time for finding a response by recursive search for the IP address of the computing device during the time period, number of one of different requests and same requests received from the IP address of the computing device during the time period, and number of requests for which a corresponding response includes at least one of a 'NXDOMAIN' attribute, a 'ServerFail' attribute and a standard attribute received from the IP address of the computing device during the time period.

11. The DNS as claimed in claim 10, wherein the quarantine engine is configured to compare at least one of the quarantine parameters with a threshold value from amongst a list of plurality of threshold values.

12. The DNS as claimed in claim 9, wherein the cache is associated with the DNS.

13. The DNS as claimed in claim 9, wherein the quarantine engine is configured to de-quarantine the IP address after expiry of a predetermined time period.

14. The DNS as claimed in claim 9, wherein the quarantine engine is configured to store the IP address of the computing device in a list that includes quarantined IP addresses.

15. A non-transitory computer readable medium having a set of computer readable instructions that, when executed, cause a computing system to:

receive a domain name request from a computing device, quarantine an IP address of the computing device by analyzing the domain name request based on a predefined set of rules to trigger a quarantine mode, wherein restricted services are provided to the computing device in the quarantine mode, provide, in the quarantine mode, a response corresponding to the domain name request, to the computing device, after determining that the response is available in a cache, wherein the response is one of an expired response and an unexpired response based on a Time to Live (TTL) of the response; and abstain, in the quarantine mode, from providing the response corresponding to the request, after determining that the response is not available in the cache, wherein the computer readable medium is to further abstain from performing a recursive search for accessing the response corresponding to the domain name request.

* * * * *